(12) United States Patent
Neesham

(10) Patent No.: US 11,667,245 B2
(45) Date of Patent: Jun. 6, 2023

(54) EXPENDABLE ROOF TOP CARGO CARRIER FOR A VEHICLE

(71) Applicant: Tony Neesham, Kennebunk, ME (US)

(72) Inventor: Tony Neesham, Kennebunk, ME (US)

( * ) Notice: Subject to any disclaimer, the term of this patent is extended or adjusted under 35 U.S.C. 154(b) by 67 days.

(21) Appl. No.: 17/531,964

(22) Filed: Nov. 22, 2021

(65) Prior Publication Data

US 2023/0032972 A1    Feb. 2, 2023

Related U.S. Application Data

(60) Provisional application No. 63/227,412, filed on Jul. 30, 2021.

(51) Int. Cl.
    *B60R 9/042*     (2006.01)
    *B60R 9/055*     (2006.01)
    *B60R 9/045*     (2006.01)

(52) U.S. Cl.
    CPC .............. *B60R 9/042* (2013.01); *B60R 9/045* (2013.01); *B60R 9/055* (2013.01)

(58) Field of Classification Search
    CPC .......... B60R 9/042; B60R 9/045; B60R 9/055
    See application file for complete search history.

(56) References Cited

U.S. PATENT DOCUMENTS

| | | | | |
|---|---|---|---|---|
| 3,902,642 | A | 9/1975 | McNeece | |
| 4,345,706 | A | 8/1982 | Benit | |
| 4,601,419 | A | 7/1986 | Bird | |
| 4,867,361 | A | 9/1989 | Burnham | |
| 5,285,942 | A * | 2/1994 | Wills | A63C 11/026 224/328 |
| 5,415,333 | A * | 5/1995 | Wills | A63C 11/026 224/917.5 |
| 5,582,313 | A * | 12/1996 | Envall | B60R 9/055 312/265.5 |
| 5,799,848 | A * | 9/1998 | Wills | B60R 9/055 224/329 |
| 5,827,036 | A * | 10/1998 | Steffes | B60R 9/0426 224/310 |
| 6,152,339 | A | 11/2000 | Kreisler | |
| 6,679,673 | B1 | 1/2004 | Stahler et al. | |
| 8,857,684 | B1 | 10/2014 | Calvert | |
| 9,731,659 | B2 | 8/2017 | Goldberg | |
| 10,286,853 | B1 * | 5/2019 | Carbone | G05D 3/10 |
| 10,406,986 | B2 | 9/2019 | Roy et al. | |
| 10,569,714 | B2 * | 2/2020 | Amoriello | F04D 29/044 |
| 2004/0188478 | A1 | 9/2004 | Williams | |

(Continued)

*Primary Examiner* — Brian D Nash
(74) *Attorney, Agent, or Firm* — Southern Plains IP Law PLLC; Sue C. Watson

(57) ABSTRACT

A cargo carrier for the roof top of a vehicle includes a housing, a center module, and an end module, and the center and end modules have a retracted position within the housing. The end module extends away from the center module to expand the cargo carrier in a partially expanded position, while the center module also extends away from the housing, and along with the previously extended end module, forms a fully expanded position of the cargo carrier. A telescoping assembly along with telescoping rails which coordinate to operate simultaneously to move the center module and the end module into the retracted position within the housing, as well as into the partially expanded position, and the fully expanded position outside of the housing.

20 Claims, 11 Drawing Sheets

(56) References Cited

U.S. PATENT DOCUMENTS

| | | | |
|---|---|---|---|
| 2005/0023314 A1 | 2/2005 | Williams et al. | |
| 2005/0045678 A1* | 3/2005 | Hurd | B60R 9/055 224/319 |
| 2006/0043130 A1* | 3/2006 | Dabrowski | B60R 9/055 224/328 |
| 2007/0119886 A1* | 5/2007 | Jablonski | B60R 9/04 224/310 |
| 2008/0017679 A1* | 1/2008 | Leblanc | B60R 9/055 224/315 |
| 2011/0186608 A1* | 8/2011 | Sautter | B60R 9/055 224/328 |
| 2013/0264366 A1* | 10/2013 | Hubbard | B60R 9/055 224/328 |
| 2014/0132022 A1* | 5/2014 | Espig | B60J 7/1657 296/37.7 |
| 2014/0158727 A1* | 6/2014 | Sautter | B60R 9/055 224/315 |
| 2021/0178979 A1 | 6/2021 | Buchholtz Storm et al. | |
| 2021/0245670 A1* | 8/2021 | Nilvius | E05F 15/53 |
| 2023/0032110 A1* | 2/2023 | Neesham | B60R 9/045 |

\* cited by examiner

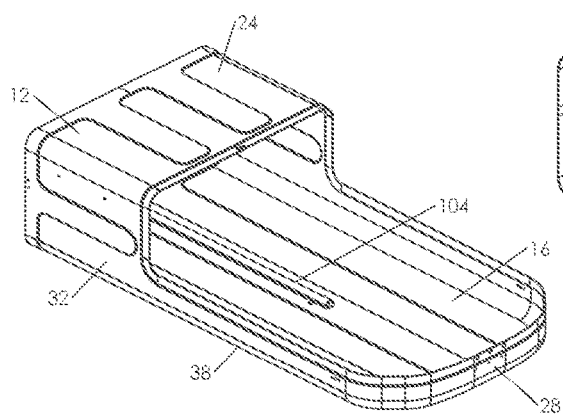
FIG. 8A
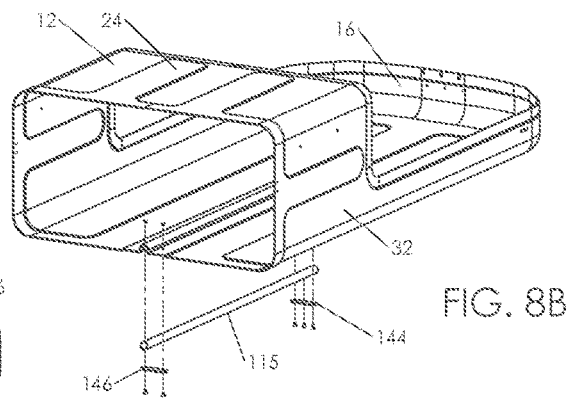
FIG. 8B
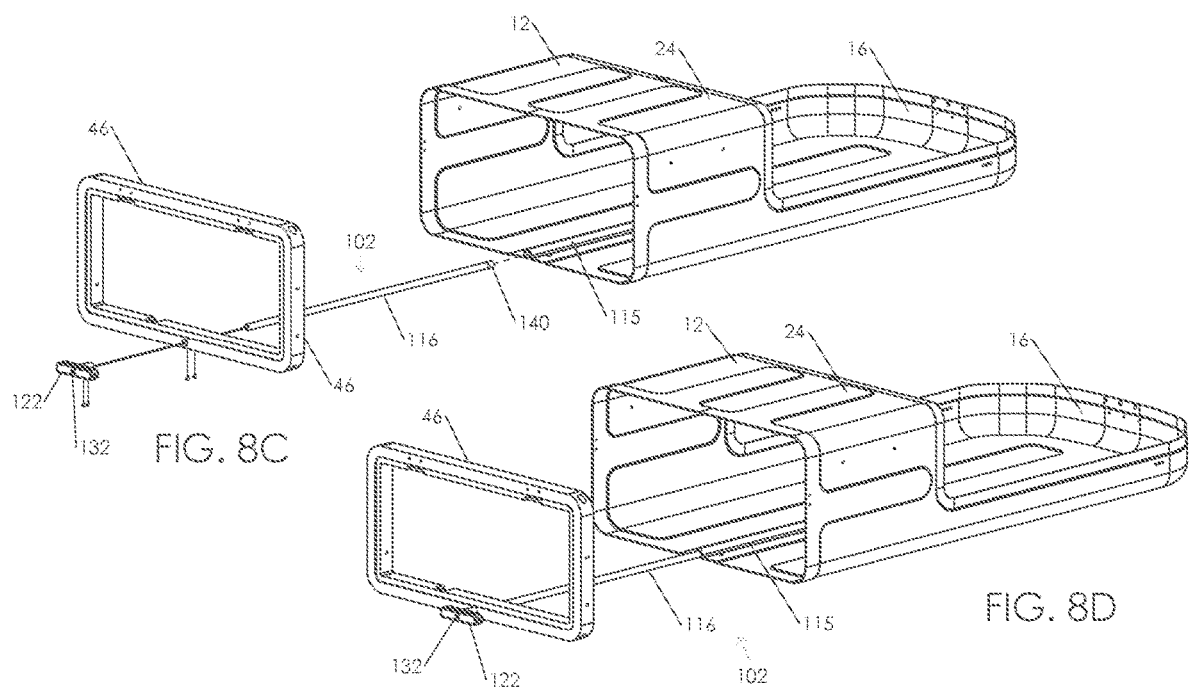
FIG. 8C
FIG. 8D

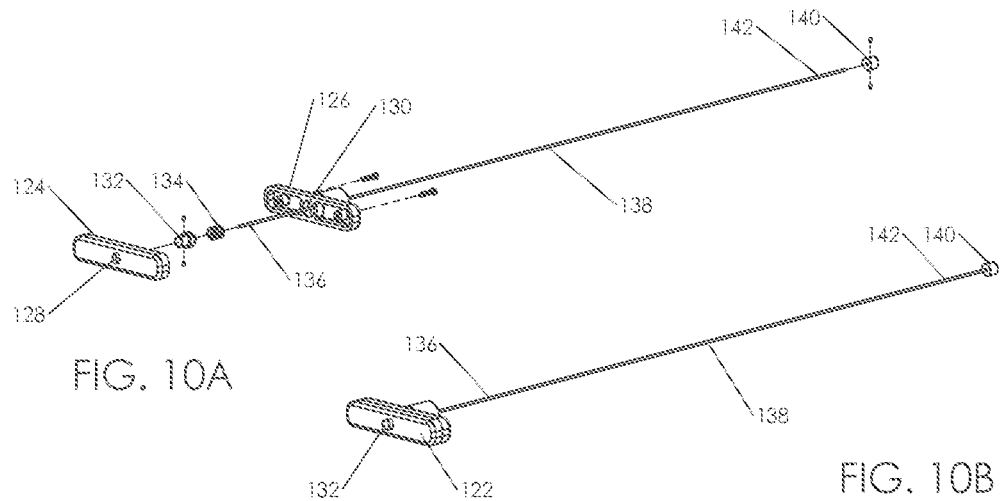
FIG. 10A
FIG. 10B
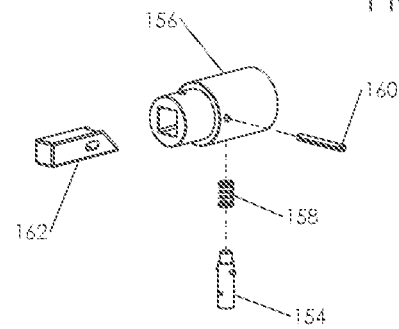
FIG. 11A
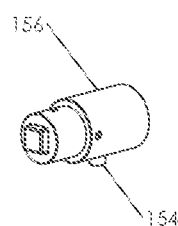
FIG. 11B

EXPENDABLE ROOF TOP CARGO CARRIER FOR A VEHICLE

FIELD OF THE INVENTION

The present invention relates to carriers for carrying cargo on a roof top of a vehicle, such as an automobile. In particular, the present invention relates to cargo carriers positioned on a roof top of a vehicle which can are extendable, i.e., configured to telescopically expand and retract.

BACKGROUND

Carriers held on the roof top of a vehicle are commonly used when one or more persons travel for work, enjoyment, vacations, when moving locations, and the like. In some instances, a standard piece of luggage is strapped or connected to rails positioned on the roof of a vehicle. Of course, when moving more than clothing, such as taking skis on a vacation, tennis rackets, and other sporting goods of various types, configurations, and dimensions, it can be problematic as to how they may be safely contained on the roof top of a vehicle, such as a car, SUV, light truck, van, and the like.

Finding carriers that are sufficiently strong and of a sufficient size to hold various configurations and dimensions of different objects on a roof top of a vehicle can be challenging. In addition, when only a few objects, such as a few pieces of luggage, are used in a large carrier, the luggage may shift within the larger space and it may become damaged, or contents within the luggage or other objects placed within the same cargo space may be damaged.

This is because currently available products are not adaptable to accommodate varying sizes of cargo. What a person would carry with him/her on a weekend at the beach may be significantly less and different than what a person would carry with him/her on a two week vacation to camp and/or snow ski in the mountains. Current products are not configured to conformationally adapt to their owners varying cargo requirements.

A container or carrier which is small enough for a short weekend outing yet sufficiently expandable to accommodate snow skis and a two week vacation in the mountains would be desirable. Such a carrier would provide a choice of the amount of expansion for cargo, and otherwise would be configured to retain its smaller, contracted, size. Such a carrier would desirably also safely extend beyond the tailgate or bumper of a vehicle.

SUMMARY OF THE INVENTION

In one embodiment of the present invention, a carrier for the roof of a vehicle comprises a housing including an outer surface and an inner surface. The inner surface forms a compartment within the housing, and the housing including a first opening having a first door connected thereto, and a second opening. The carrier also includes a center module including an outer surface, and an opening therethrough forming an inner surface. The inner surface forms a compartment within the center module. The center module has a first perimeter and a second perimeter. The outer surface of the center module is configured to fit within the inner surface of a portion of the housing. The carrier also includes an end module including an outer surface and an opening therethrough forming an inner surface. The inner surface forms a compartment within the end module. The end module has an outer surface configured to fit within the inner surface of the center module. The end module carries a frame positioned at an end perimeter thereof. The frame includes a second door for the second opening in the carrier. The carrier further includes a telescoping assembly connected to an outer surface of the housing and to the frame. The telescoping assembly is configured to: a) hold the center module and the end module in the portion of the housing, b) move the end module away from the center module positioned within the portion of the housing, and c) move the center module away from the portion of the housing while the end module is positioned away from the center module. In addition, the carrier includes a first pair of telescoping rails and a second pair of telescoping rails, the first pair of telescoping rails connected to each side of the portion of the housing and to each side of the center module, respectively, and the second pair of telescoping rails connected to the each side of the center module and to each side of the end module respectively. When the telescoping assembly is actuated to move the end module away from the center module, the second pair of telescoping rails simultaneously move and support the end module, and when the telescoping assembly is actuated to move the center module away from the portion of the housing, the first pair of telescoping rails simultaneously move and support the center module.

In an aspect of the embodiment, the telescoping assembly is actuated to move both the end module and the center module away from the housing in a fully extended position. The telescoping assembly is actuated to move the end module away from the center module which is retained in the housing to form a partially extended position. The telescoping assembly is actuated to retain both the center and end modules in a retracted position within the portion of the housing. One portion of the telescoping assembly is carried by the housing and an opposite other portion of the telescoping assembly is carried by the frame. The telescoping assembly includes a push button which actuates movement of at least one of the center module and the end module. The movement actuated by the push button moves the at least one of the center module and the end module into a preselected position, and wherein the preselection position is selected from a retracted position, a partially extended position, and a fully extended position.

In another aspect of the embodiment, Each rail of the upper pair of telescoping rails includes a first section, a second section, and a third section, and wherein the first sections are connected to the sides, respectively, of the portion of the housing, and the third sections are connected to the sides, respectively, of the center module, and each second section moves away from each first section, and each third section moves away from each second section when in the fully expanded position, and at least a portion of the first, second, and third sections overlap when in a retracted position. Each rail of the lower pair of telescoping rails include a first section, a second section, and a third section. The first sections are connected to the sides, respectively, of the center module, and the third sections are connected to the sides, respectively, of the end module, and each second section moves away from the each first section and each third section moves away from each second section when in the fully expanded position, and at least a portion of the first, second, and third sections overlap when in the retracted position.

In still another aspect of the embodiment, the carrier includes at least one pair of legs on at least one of the end module and the center module. In one alternative of the embodiment of the invention, the carrier includes the at least one pair of legs include a pair of telescopic legs that are each telescopically adjustable and which are foldably carried on a lower surface of the center module. In another alternative or additional aspect of the embodiment, the at least one pair of legs include a pair of legs having a plurality of openings therein that are connected to a portion of the frame, and each leg is extendably adjustable.

In another embodiment of the invention, a method of using a carrier for the roof of a vehicle, comprises providing a housing including an outer surface and an inner surface. The inner surface forms a compartment within the housing. The housing includes a first opening having a first door connected thereto, and a second opening. The method also includes providing a center module to the housing. The center module includes an outer surface and an opening therethrough forming an inner surface. The inner surface provides a compartment within the center module. The center module has a first end positioned to move into the second opening of the housing, and the outer surface of the center module configured to fit within the inner surface of the portion of the housing through the second opening therein. The method further comprises connecting the center module to the housing by connecting a first pair of telescoping rails to opposing sides of the housing and to opposing sides of the center module, respectively. In addition, the method includes providing an end module including an outer surface and an opening therethrough forming an inner surface. The inner surface provides a compartment within the end module. The end module has a first end positioned to move into a second opening of the center module, and the outer surface of the end module is configured to fit within the inner surface of the center module through the second opening therein. The end module carries a frame positioned at a second end thereof, and the frame includes a second door to close the second opening. And, the method comprises connecting the end module to the center module by connecting a second pair of telescoping rails to opposing sides of the center module and to opposing sides of the end module, respectively. Moreover, the method comprises actuating a telescoping assembly connected to at least the housing and the frame, and moving the end module away from the center module from the retracted position to the partially extended position, and actuating the telescoping assembly and moving the center module away from the portion of the housing from the partially extended position to the fully extended position. Also, the method comprises simultaneously moving and supporting the end module via at least the second pair of telescoping rails when the telescoping assembly is actuated, thereby simultaneously moving the end module away from the center module in the partially extended position. And, the method comprises simultaneously moving and supporting the center module by at least the first pair of telescoping rails when the telescoping assembly is actuated, thereby simultaneously moving the center module away from the housing in the fully extended position.

In an aspect of the other embodiment, the method further comprising the step of actuating the telescoping assembly to move the end module and the center module into a retracted position within the portion of the housing, and comprising the step of actuating the telescoping assembly to move the end module away from the center module retained within the housing to from a partially extended position, and wherein after the end module is extended, actuating the telescoping assembly to move the center module away from the portion of the housing to place the carrier in a fully extended position. One portion of the telescoping assembly is carried by the housing and an opposite other portion of the telescoping assembly is carried by the frame. The telescoping assembly includes a push button which actuates movement of at least one of the center module and the end module. The movement actuated by the push button moves the at least one of the center module and the end module into a preselected position, and wherein the preselection position is selected from a retracted position, a partially extended position, and a fully extended position.

In another aspect of the other embodiment, in the step of connecting the center module to the housing by connecting a first pair of telescoping rails to opposing sides of the housing and to opposing sides of the center module. Each rail of the first pair of telescoping rails includes a first section, a second section, and a third section, and the first sections are connected to the opposing sides, respectively, of the portion of the housing, and the third sections are connected to the opposing sides, respectively, of the center module, and each second section moves away from each first section, and each third section moves away from each second section when in the fully expanded position, and at least a portion of the first, second, and third sections overlap when in the retracted position. Each rail of the second pair of telescoping rails includes a first section, a second section, and a third section, and the first sections are connected to the opposing sides, respectively, of the center module, and the third sections are connected to the opposing sides, respectively, of the end module, and each second section moves away from each first section, and each third section moves away from each second section when in the fully expanded position, and at least a portion of the first, second, and third sections overlap when in the retracted position.

In a further aspect of the other embodiment, further including a step of providing at least one pair of legs to the carrier, wherein only the at least one pair of legs touch the roof of the vehicle. In one alternative, the pair of legs are telescopic and are foldably carried on a lower surface of the end module. In an additional or alternative, the at least one pair of legs include a pair of legs having a plurality of openings therein that are connected to a portion of the frame, wherein each leg is extendably adjustable.

In yet another embodiment of the invention, a carrier assembly for the roof of a vehicle comprises a housing including an inner surface. The inner surface forms a compartment therein. The housing includes a first opening having a first door connected thereto, and a second opening. The carrier assembly also includes a center module including an outer surface and an opening therethrough forming an inner surface configured to form a compartment therein. The outer surface of the center module is configured to fit within the compartment of a portion of the housing. The carrier assembly also includes an end module which includes an outer surface and an opening therethrough forming an inner surface configured to form a compartment. The end module is configured to fit within the compartment of the center module. The end module carries a frame positioned at an end perimeter thereof. The frame includes a second door positioned to cover the second opening in the carrier. In addition, the carrier assembly includes a telescoping assembly connected to an outer surface of the housing and to the frame. The telescoping assembly is configured to: a) hold the center module and the end module in the portion of the housing, b) move the end module into a preselected position away from the center module, and c) move the center module into a preselected position away from the portion of the housing while the end module is positioned away from the center module.

In one aspect of the still other embodiment, one portion of the telescoping assembly is carried by the housing and an opposite other portion of the telescoping assembly is carried by the frame. The telescoping assembly includes a push button which actuates movement of at least one of the center module and the end module between preselected positions of the at least one of the center module and the end module. The movement is actuated by the push button and moves the at least one of the center module and the end module into the preselected position and holds the at least one of the center module and the end module in the preselected position. The preselection position is selected from the group consisting of the retracted position, the partially extended position, and the fully extended position.

In another aspect of the still other embodiment, the embodiment further comprises a first pair of telescoping portions and a second pair of telescoping portions, the first pair of telescoping portions connected to the portion of the housing and to the center module, respectively, and the second pair of telescoping portions connected to the center module and to the end module respectively, wherein when the telescoping assembly is actuated to move the end module away from the center module, the second pair of telescoping portions simultaneously move and support the end module, and wherein when the telescoping assembly is actuated to move the center module away from the portion of the housing, the first pair of telescoping portions simultaneously move and support the center module.

BRIEF DESCRIPTION OF THE DRAWINGS

The disclosure will be better understood and features set forth above will become apparent when consideration is given to the following detailed description thereof. Such description makes reference to the annexed drawings wherein:

vent.

FIG. 8A is a perspective view of the housing of FIG. 1, but without the cargo door removed, showing the first hollow semi-cylinder in a lower surface of the housing;

FIG. 8B is a perspective view of the housing of FIG. 8A, showing a placement of the housing tube within the first hollow semi-cylinder;

FIG. 8C is a perspective view of the housing of FIG. 8A, illustrating a proposed placement of the telescoping assembly within the tube in within the housing tube in the housing;

FIG. 8D is a perspective view of the of the housing of FIG. 8A, showing the positioned of the telescoping assembly relative to the housing and the frame;

FIG. 10A is an exploded view of a portion of the telescoping assembly of the present invention;

FIG. 10B is a perspective view of the portion of the telescoping assembly of FIG. 10A;

FIG. 11A is an exploded view of another portion of the telescoping assembly of the present invention;

FIG. 11B is a perspective view of the portion of the telescoping assembly of FIG. 11A;

DETAILED DESCRIPTION

Figure 1:
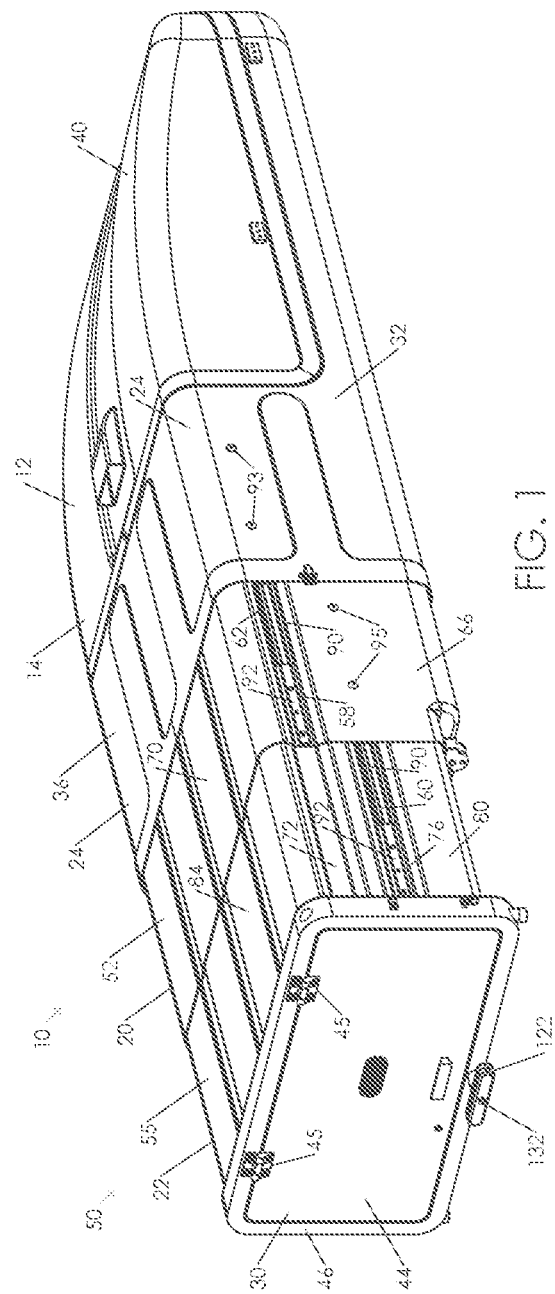
FIG. 1 is a right perspective view of the extendable roof top cargo carrier for a vehicle according to the present invention, illustrating a fully expanded position of the carrier.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. The variations of "comprising", "including" and "having", such as, but not by way of limitation, "comprise", "include", "have" or "has", are also included in this definition. Any examples of operating parameters and/or environmental conditions are not exclusive of other parameters/conditions of the disclosed embodiments.

Referring to FIGS. 1-5, the carrier or carrier 10 for holding cargo on the roof top of a vehicle includes a housing 12. The housing 12 includes an outer surface 14 and an inner surface 16 which forms an opening or space 18 therethrough for carrying cargo (not shown). The housing 12 also includes, but not by way of limitation, a center module 20 and an end module 22 connected to the housing 12 which are positioned side-by-side within a holding portion 24 of the inner surface 16 of the housing 12 and form a nested group or retracted position.

Figure 2:
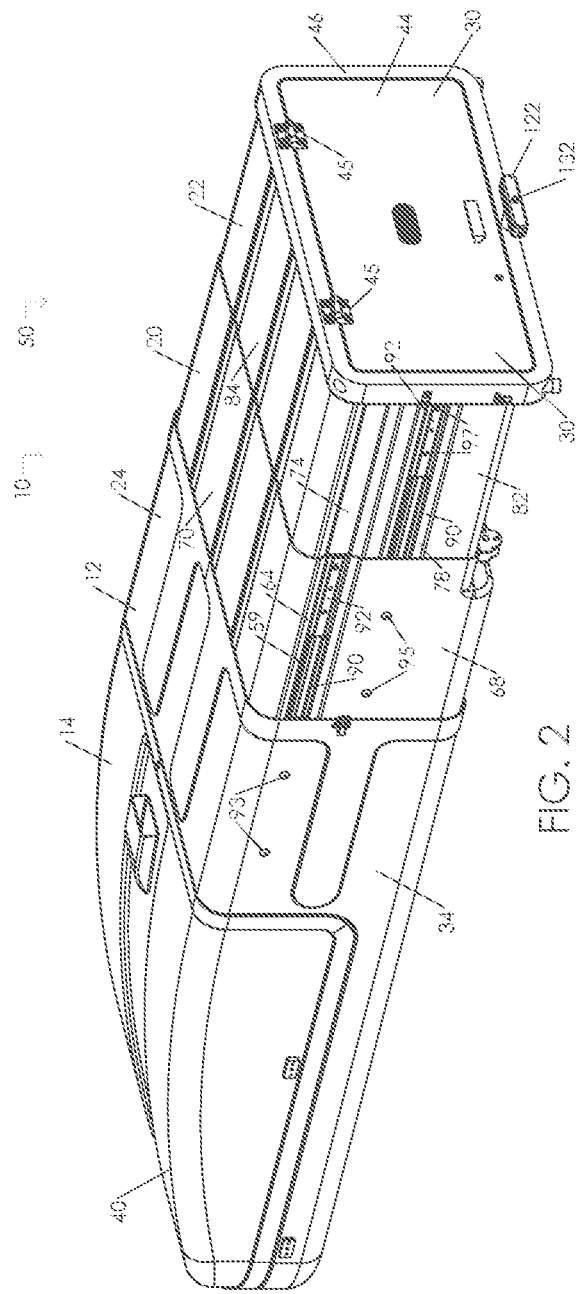
FIG. 2 is a left perspective view of the view of the extendable roof top cargo carrier of FIG. 1.
Figure 3:
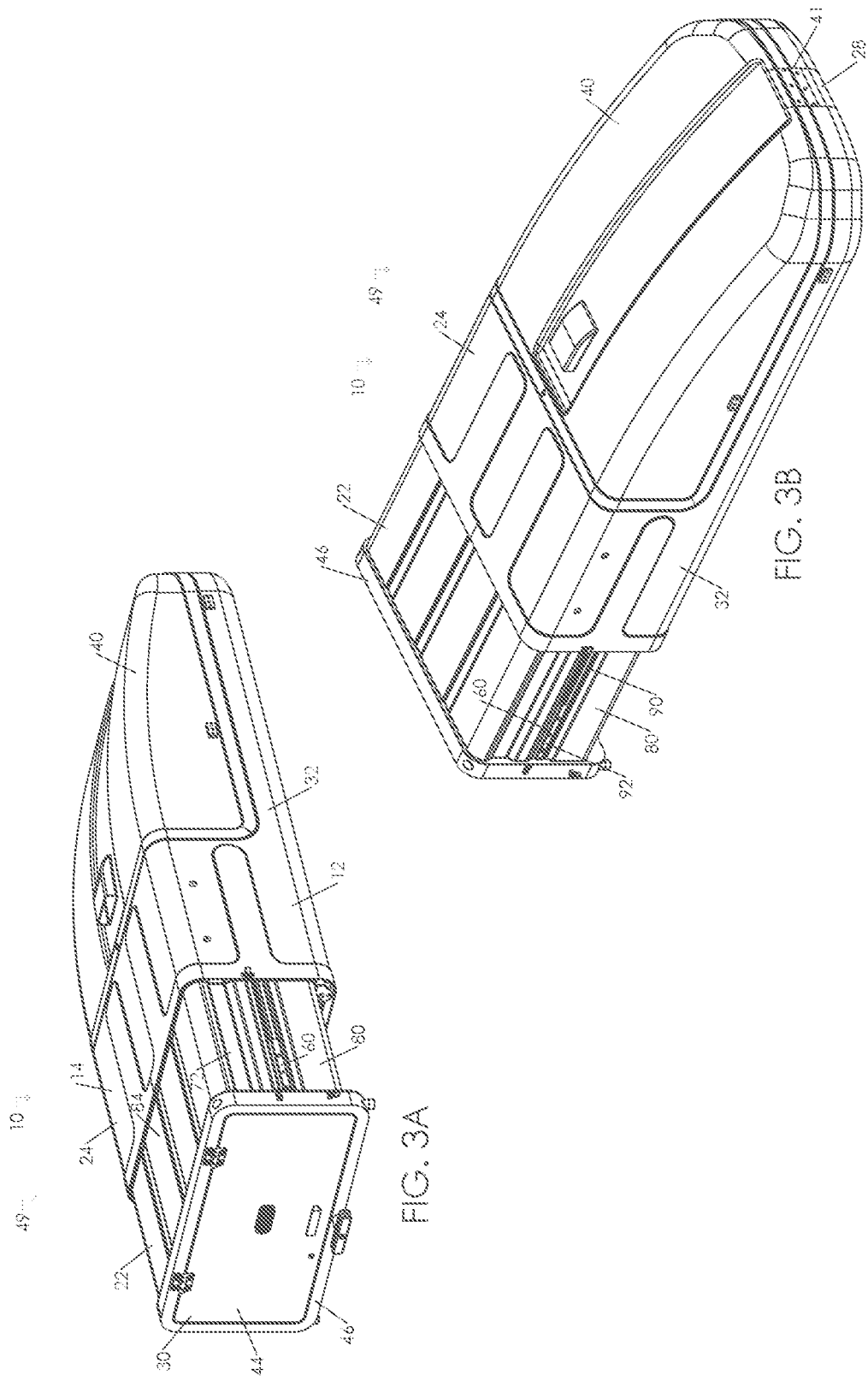
FIG. 3A is a right rear perspective view of the extendable roof top cargo carrier of FIG. 1, showing a partially extended position of the carrier.
FIG. 3B is a front right perspective view of the extendable roof top cargo carrier of FIG. 1, illustrating the partially extended position of the carrier.
Figure 4:
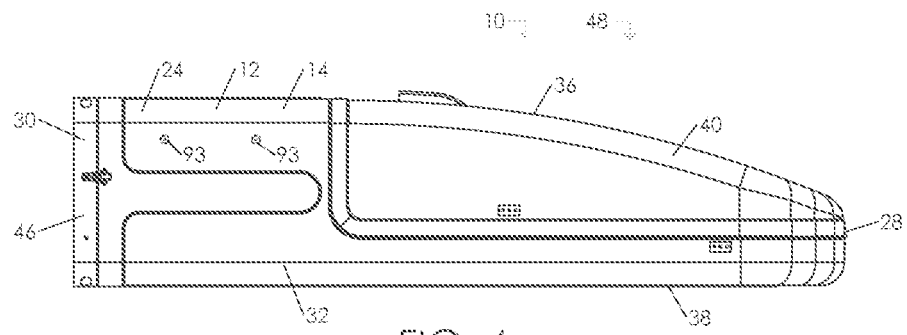
FIG. 4 is a side view of the extendable roof top cargo carrier of FIG. 1, showing the fully retracted position of the carrier.
Figure 5:
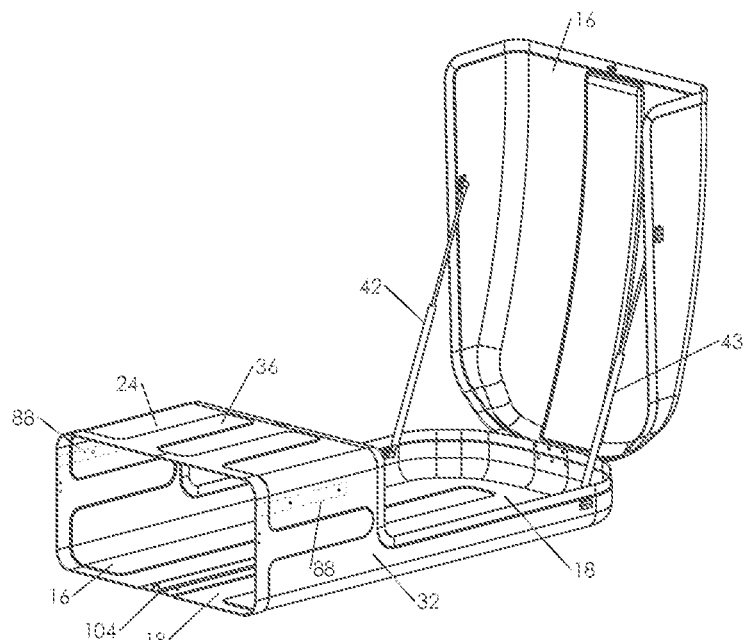
FIG. 5 is a perspective view of the housing of the extendable roof top carrier for FIG. 1, showing a front cargo door in an open position.

The housing 12 also includes a front end 28, a back end 30, two opposing spaced-apart sides 32, 34, an upper surface 36, and a lower surface 38. The carrier 10 also desirably has a front cargo door 40 formed from portions of the front end 28, the upper surface 36, and each side 32, 34. As illustrated in FIGS. 4 and 5, the front cargo door 40 forms a portion of the housing 12, and blends into the housing 12 when closed. The front cargo door 40 is pivotally connected via a hinge 41 to the front end 28 of the housing 12 and its pivotal movement is controlled by a pair of telescoping rods 42, 42. The housing 12 includes a rear door 44 connected to a frame 46 which is positioned on the end module 22, and accessible when the end module 22 is in the retraced position 48 (FIG. 4), the partially expanded position 49 (FIGS. 3A and 3B), or the expanded position 50 (FIGS. 1 and 2).

The center module 20, as illustrated in FIGS. 1, 2, 4, and 6A-6D, has an outer surface 52 that is configured to fit within and substantially conform to the configuration of the inner surface 16 within the portion 24 of the housing 12, and the center module 20 also includes an inner surface 53. The inner surface 53 forms an opening 54 therethrough which cooperates with the opening or space 18 in the housing to provide storage space of cargo. The center module 20 releasably connects to the portion 24 and may be positioned in the retracted position 48 within the portion 24 of the carrier 10 or in the expanded telescoping position 50 extending substantially away from the first portion 24.

The end module 22, illustrated in FIGS. 1, 2, 3, 7A, and 7B, has an outer surface 55 that is configured to fit within and substantially conform to the configuration of an inner surface 53 of the center module 20. The end module 22 also includes an inner surface 56. The inner surface 56 forms an opening 57 therethrough which cooperates with the opening 54 in the center module 20 and the opening or space 18 in the housing 12 to provide storage space of cargo. The end module 22 is releasably connected to the center module 20 and may be positioned in the retraced position 48 within the center module 20, in the partially extended position 49, or in the expanded position 50 extending substantially away from the center module 20.

The center module 20 and the end module 22, as illustrated in FIGS. 1, 2, 3, 6A-6C, each include a first pair of telescoping rails 58, 59 and a second pair of telescoping rails 60, 61, respectively, which permit both the center module 20 to telescopically move away from the portion 24 of the housing 12, and the end module 22 to telescopically move away from the center module 20, respectively. Telescoping rails, for example, but not by way of limitation, may be formed from ball bearing sliding drawer channels, which are commercially available.

At least a portion of the first pair of telescoping rails 58, 59 are positioned within an upper pair of grooves 62, 64, respectively, formed on the outer surface 52 of each respective side 66, 68, of the center module 20, toward an upper surface 70 thereof. The end module 22 includes two upper pairs of grooves 72, 74. Upper grooves 72, 74 are positioned spaced apart on the outer surface 54 of opposing sides 80, 82, respectively, of the end module 22 near an upper surface 84 thereof. The pair of upper grooves 72, 74 align with the pair of grooves 62, 64, respectively, formed on the center module 20, to permit the end module 22 to be positioned in an overlapping retracted position 48 within the center module 20. The lower pair of grooves 76, 78 of the end module 22 are positioned in a median area on the outer surface 54 of each opposing side 80, 82, respectively, of the end module 22. At least a portion of the second pair of drawer channels 60, 61 are positioned in the pair of lower grooves 76, 78, respectively, which are positioned in the median area of on the sides 80, 82, respectively, of the end module 22.

Referring now to the first pair of telescoping rails 58, 59, and the second pair of telescoping rails 60, 61, each referenced telescoping rail desirably may include three rails, namely a first, second, and third rail 88, 90, 92, respectively, which slidably connect together and overlap at least partially in a side-by-side alignment in a retracted position. However, in a telescopic expanded position, at least two of the three rails, namely the second rail 90 and the third rail 92 of each respective telescoping rail 58, 59, 60, 61, are configured to telescopically move away from the first rail 88, and each third rail 92 is configured to extend away from each second rail 90.

Each first rail 88 of the first pair of telescoping rails 58, 59 is positioned in a fixed, spaced-apart position on the inner surface 16 of the portion 24 of the housing 12 via a first pair of rivets 93. Each second rail 90 and each third rail 92 are configured to telescopically slide or move relative to each other into the partially expanded position 49 (when only the center module 20 is moved away from the housing 12) and into the fully expanded position 50 (when both the first and end modules, respectively, move into fully expanded position 50). The second and third rails 90, 92, respectively slide or move into the respective pair of upper grooves 62, 64. Each third rail 92 of the first pair of rails 58, 59 also includes a pair of rivets 97 which connect each third rail to the center module 20.

Each first rail 88 of the second pair of telescoping rails 60, 61 is positioned in a fixed, spaced-apart position on the inner surface 56 of the center module 20 via a second pair of rivets 95. Each second rail 90 and each third rail 92 are configured to telescopically slide or move into the expanded position 50 (when the end module 22 is moved away from the center module 20). The second and third rails 90, 92, respectively, of the respective second pair of telescoping rails 60, 61, slide or move in the pair of lower grooves 76, 78, respectively.

Each third rail 92 of the second pair of telescoping rails 60, 61, also includes a pair of rivets 97 which connect each third rail to the to the end module.

Also connecting the housing 12, the center module 20, the end module 22, and the frame 46 together in an axial alignment 100 is a telescoping assembly 102, as illustrated in FIGS. 8A-8D, 9A-9D, 10A-10B, 11A-11B, 12A-12B, and 13A-13B. The telescoping assembly 102 controls the extension and retraction of the first and end modules 20, 22, respectively, relative to the housing 12.

Figure 6A:
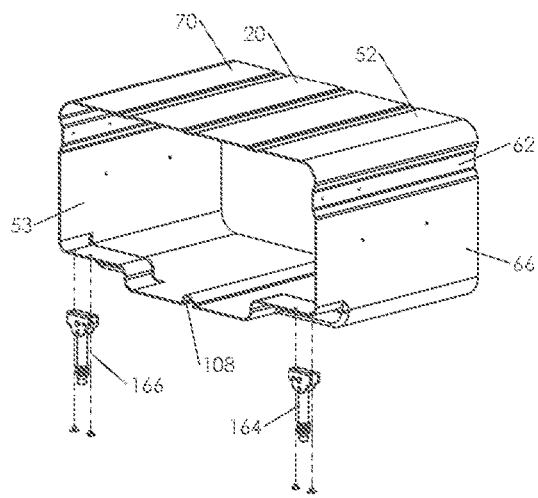
FIG. 6A is a perspective view of the center module FIG. 1, illustrating features of the center module and showing the components of a first pair of folding leg assemblies positioned to be connected thereto.
Figure 6B:
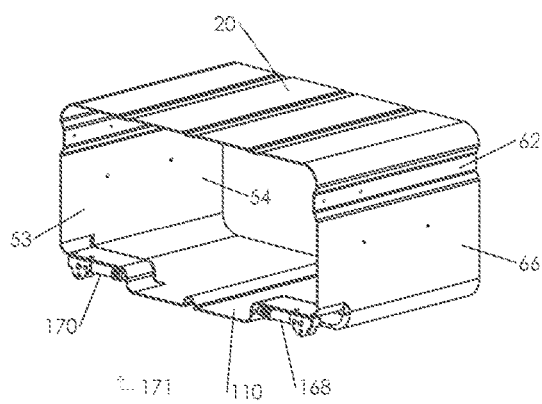
FIG. 6B is a perspective view of the center module of FIG. 6A, showing the pair of folding leg assemblies connected to the center module and positioned in a folded stowed position.
Figure 6C:
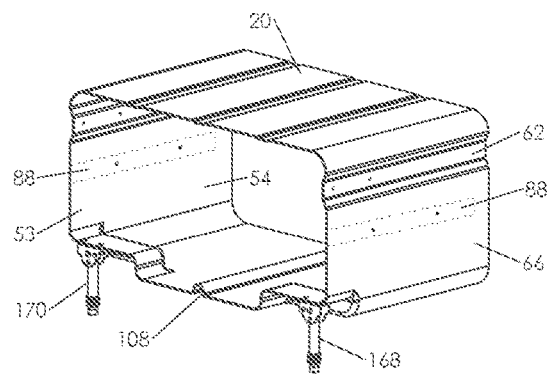
FIG. 6C is a perspective view of the center module of FIG. 6A, illustrating a pair of telescoping legs of the pair of folding leg assembly.
Figure 6D:
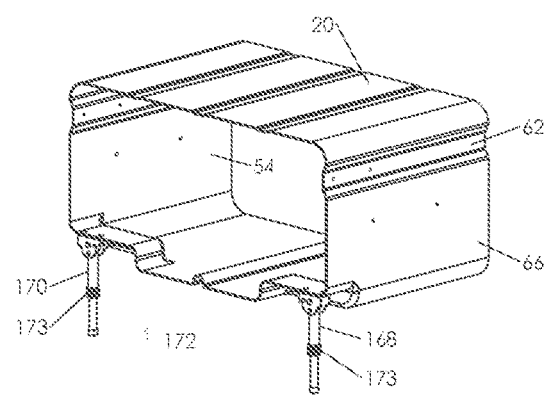
FIG. 6D is a perspective view of the center module of FIG. 6A, showing the pair of folding leg assemblies in a telescoping and deployed position.
Figure 7A:
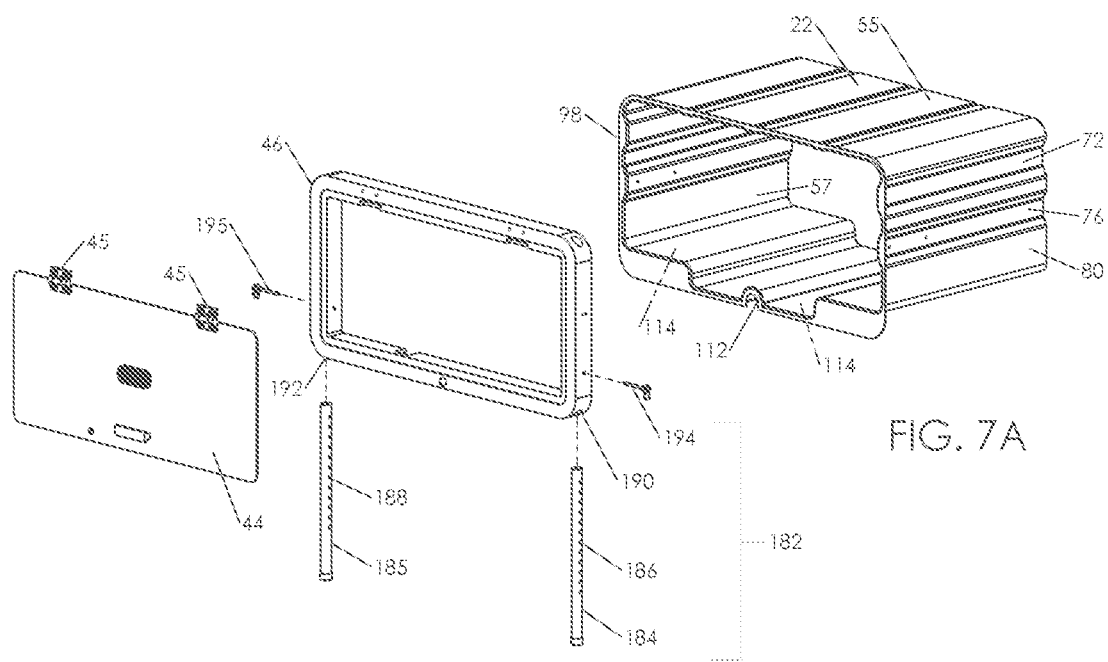
FIG. 7A is an exploded view of the end module of FIGS. 1 and 7B, illustrating the frame, the back door, and a second leg assembly including a pair of legs having a plurality of openings therein, the legs positionable within the frame.

The telescoping assembly 102 includes a first hollow semi-cylinder 104 formed in a lower surface 38 of the outer surface 14 of the housing 12 (FIG. 5) and extends axially therethrough. Axially aligned with the first hollow semi-cylinder 104, a second hollow semi-cylinder 108 is formed on a lower surface 110 of the outer surface 52 of the center module 20 (FIG. 6C). And axially aligned with the second hollow semi-cylinder 108, a third hollow semi-cylinder 112 is positioned on a lower surface 114 of the outer surface 54 of the end module 22 (FIG. 7A). A housing tube 115 is positioned in the first hollow semi-cylinder 104, as shown in FIGS. 8B-8D. The telescoping assembly 102 also includes at least one tube 116 which is configured to be slidably positioned within the housing tube 115 as well as slidingly engage the second and third hollow semi-cylinders 108, 112, respectively. The first end of the tube 116 is positioned toward the front end 28 of the housing 12. An opposite second end of the tube 116 is positioned through the frame 46, is desirably connected to the frame 46 which is connected to the end perimeter 98 of the end module 22.

Referring to FIGS. 8C, 8D, 10A-10B, and 12A-12B, the telescoping assembly 102 includes a handle 122 having a first handle portion 124 and a second handle portion 126, each first and second handle portion 124, 126 having first and second openings 128, 130, respectively, therein. A push button 132 is positioned in the first opening 128 of the first handle portion 120 and is biased by a spring 134 and contacts a first end 136 of a rod 138 which extends through the second opening 130 of the second handle portion 126. It will be appreciated that a portion of the push button 132 extends from the first opening 128 of the first handle portion 124, and that a portion of the push button 132, the spring, and the first end 136 of the rod 138 are positioned in the handle 122 between the respective first and second handle portions 124, 126. A foot 139 (a solid round disc), is connected to a second end 142 of the rod 138. The second end 142 of the rod 138 with the foot 139 thereon is positioned within the tube 116. A button pin assembly 140 is positioned at a free end of the tube 116, while the handle 112 is positioned at an opposite end of the tube 116. The housing tube 115 and the tube 116 are held in position within the first hollow semi-cylinder 104 via two brackets 144, 146 which extend over the opening formed by the first, second hollow semi-cylinder 104, as shown in FIGS. 9A-9D. It will be appreciated that more brackets, or different components may be used to accomplish holding the housing tube 15 and/or the tube 116 in the desired position.

Referring to FIGS. 9A-9D, the housing tube 115 desirably, but not by way of limitation, includes three (3) axially aligned and spaced-apart openings 148, 150, 152 which correspond to the three positions of the housing 12, the center module 20, and the end module 22, namely, the retracted position 48, the partially extended position 49, and the fully extended position 50, respectively. The telescoping assembly 102 controls the movement between each position. The control between positions is provided via the push button 132 on the handle 122 and the foot 139 which actuates the button pin assembly 140 at the end of the tube 116.

The button pin assembly 140 includes a button pin 154 which is spring biased to push outward, away from the button pin assembly 140. When the button pin 154 of the button pin assembly 140 encounters one of the openings 148, 150, 152 in the tube 116, the button pin 154 enters the respective opening 148, 150, or 152 to hold the carrier 10 and the respective center and end modules 20, 22 in the preselected position, i.e., the retracted position 48, the partially extended position 49, and the fully extended position 50, respectively. When the push button 132 on the handle 118 is pushed, the foot 139 of the rod 138 actuates a portion of the button pin assembly to retract the button pin 154 from one of the openings (148, 150, 152) in the housing tube 115 and the telescoping assembly 102 via the handle 122 and tube 116 may then move to move the carrier 10 into another preselected position. It will be understood that pushing the push button 132 while pulling the handle 122 will move the carrier 10 outward, and pushing the push button 132 while pushing the handle 122 will move one or more modules 20, 22 of the carrier 10 inward, into the carrier 10.

The button pin 140 includes a button pin housing 156 with the button pin 154 is positioned therein and biased outward by a spring 158. The button pin housing 156 includes a slotted spring pin 160 and an actuator button 162, which, when actuated by an operator pressing the push button 132 on the handle 122, within the tube 116 moves the foot 139 of the rod 138 connected to the actuator button 162 to interrupt the spring biasing of the button pin 154 as well as the button pin 154 outward, such that the button pin 154 moves inward into the button pin housing 140 and the tube 116 may be moved by the handle between openings (148, 150, 152) in the housing tube 115 therefore unlocking the carrier 10 from its previous preselected (retracted 48, partially extended 49, or fully extended 50) position and thereby enabling an operator via the telescoping assembly 102 to move the carrier 10 into another preselected position. It will be appreciated that all components described for the telescoping assembly are commercially available.

As shown in FIGS. 6A-6D, the carrier 10 may also include a pair of folding leg assemblies 164, 166 which include telescoping legs 168, 170, respectively, which may be telescopically adjusted, as needed. The pair of folding leg assemblies 164, 166 are positioned on the lower surface 110 of the center module 20, near each side 66, 68, respectively, thereof. When the carrier 10 needs additional support and stability, the pair of folding leg assemblies 164, 166 may be moved into a deployed position 172 such that the telescoping legs 168, 170 contact an outer surface 174 or a roof 176 of a vehicle 178 and may be adjusted to a telescoping position via a collar 173 provided on each telescoping leg 168, 170.

Figure 7B:
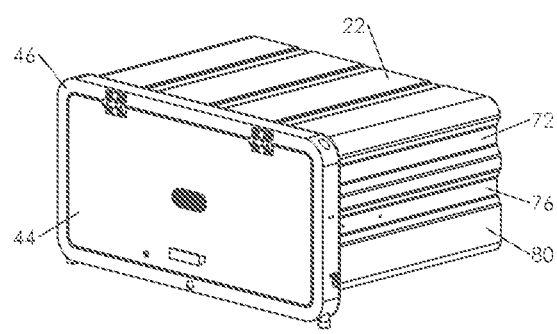
FIG. 7B is a perspective view of the end module of the carrier.
Figure 9A:
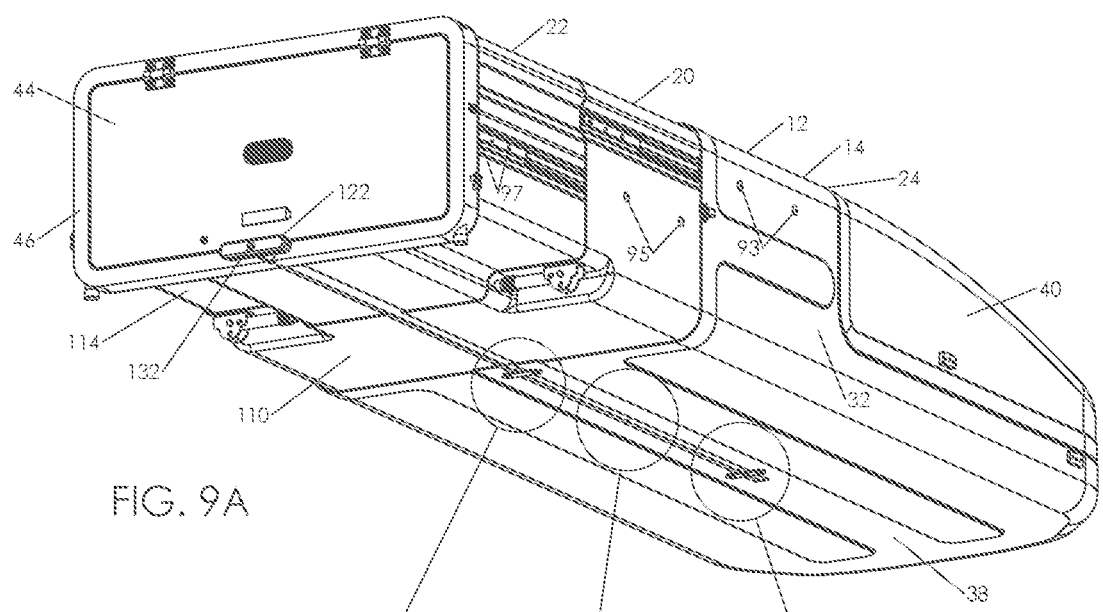
FIG. 9A is a perspective view of a lower surface of the extendable roof top cargo carrier of FIG. 1, illustrating the position that the telescoping assembly on the carrier.
Figure 9B:
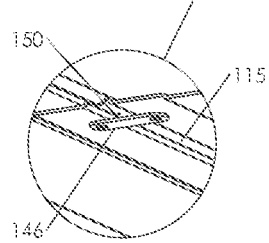
FIG. 9B is a partial view of FIG. 9A, illustrating a location for the telescoping assembly to position the carrier in the fully extended position.
Figure 9C:
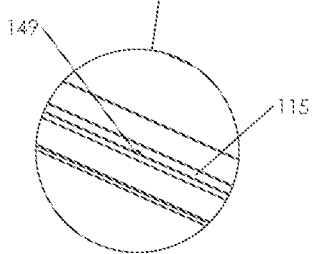
FIG. 9C is a partial view of FIG. 9A, showing another location for the telescoping assembly to position the carrier in the partially extended position.
Figure 9D:
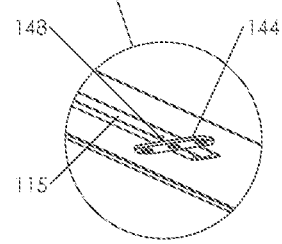
FIG. 9D is a partial view of FIG. 9A, showing yet another location for the telescoping assembly to position the carrier in the retracted position.
Figure 12A:
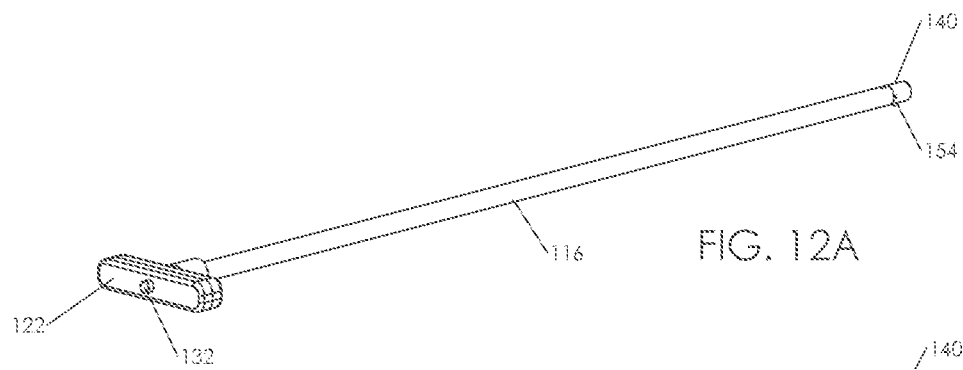
FIG. 12A is a perspective view of another portion of the telescoping assembly, illustrating the button pin assembly with the button pin extended and the push button not actuated.
Figure 12B:
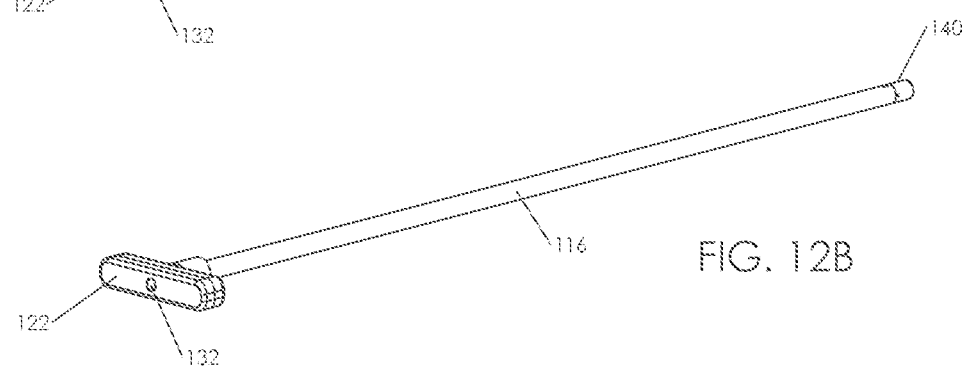
FIG. 12B is a perspective view of the portion of the telescoping assembly of FIG. 12A, showing the button pin assembly with the button pin retracted and the push button actuated.
Figure 13A:
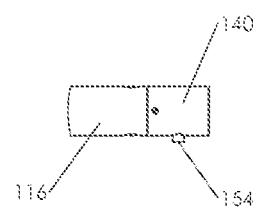
FIG. 13A is a side view of the button pin assembly of the telescoping assembly of the present invention, illustrating the button pin extended.
Figure 13B:
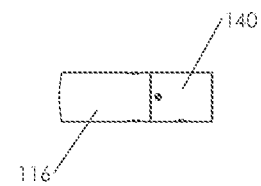
FIG. 13B is a side view of the button pin assembly of FIG. 13A, showing the button pin retracted.

Referring to FIGS. 7A and 7B, a second pair of leg assemblies 182, 183 are provided on the frame 46 of the end module 22. The second pair of leg assemblies includes a pair of legs 184, 185, and each leg of the pair of legs 184, 185 includes a plurality of openings 174, 175, respectively. Each leg of the pair of legs 184, 185 is held within openings 190, 192 in the frame 46. A pair of pins 194, 195 positioned in openings 186, 188 of the legs 184, 185, respectively, provides a means for positioning each leg 184, 185.

Figure 14:
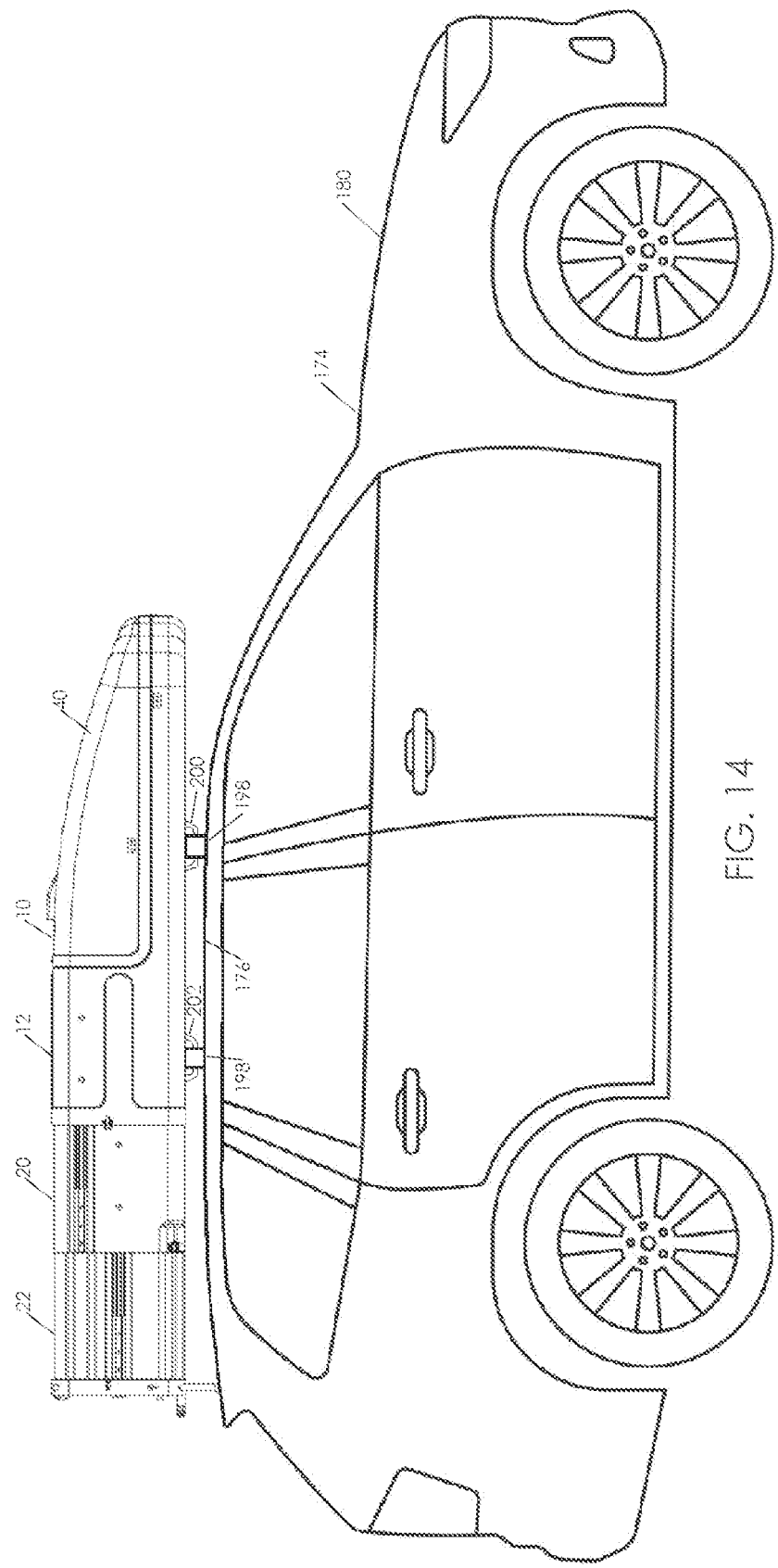
FIG. 14 is a side view of the extendable roof top cargo carrier for a vehicle of the present invention, illustrating the carrier in the fully extended position mounted to the roof top of a vehicle.

It will be appreciated that the carrier 10 is strong but light weight, and it may be easily positioned on the roof top 176 of a vehicle 180, as shown in FIG. 14, by one person. The carrier 10 is desirably connected to preexisting rails 198 on the roof top 176 of the vehicle 180 by any number of known connectors, such as U bolts 200, 202 and the like. The present embodiment of the carrier 10 is of an ovoid structure connected to a portion of a generally rectangular structure. These structural features are used for their aerodynamic shape. However, it will be understood that any shape or combination of shapes may be used, so long as the carrier 10 operates as shown and described in detail herein. The carrier 10 may extend beyond a tailgate or a bumper of a vehicle as well.

In a method of use, (FIGS. 3A-3B, FIG. 4, and FIGS. 9A-9D), from a retracted position 48 to a partially expanded position 49, an operator pushes the push button 132 on the handle 122 connected to the frame 46, to retract the button pin 154 of the button pin assembly 140 from the first opening 148 in the tubing 116. The operator then moves the telescoping assembly 102 by pulling the handle 122 outward, away from the frame 46, and simultaneously releasing the push button 132 so that when the button pin 154 of the telescoping assembly 102 encounters the second opening 150 in the tubing 116, the button pin 154 will extend through the second opening 150, while simultaneously the end module 22 is moved away from the center module 20 being held within the portion 24 of the housing 12 and the end module 22 is supported by the simultaneous telescopic extension of the second pair of rails 60, 61 positioned on each side 80, 82, respectively, of the end module 22. The pair of legs 184, 185 of the second leg assembly 182 may then be used or adjusted after the end module 22 reaches the partially expanded position 49.

Then, continuing the method of use from the partially extended position 29 to the fully extended position, as shown in FIGS. 1, 2, and 3A-3B, and FIGS. 9A-9D, if more space inside the carrier 10 is needed, the operator again repeats the operation, by again pushing the push button 132 on the handle 122 to move the foot 139 on the end of the rod 138 to actuate retraction of the button pin 154 of the button pin assembly 140 into the button pin housing 158 and away from the second opening 150 in the housing tubing 115. The operator then again moves the telescoping assembly 102 by pulling the handle 122 outward while releasing the push button 132 so that when the button pin 154 encounters the third opening 152 in the housing tube 115, and the button pin 154 will extend through the third opening 152, while simultaneously the center module 20 is moved away from the portion of the housing 24 and the center module 20 is supported by the telescopic extension of the first pair of rails 58, 59 on each side 66, 68, respectively, of the center module 20. The pair of folding leg assemblies 164, 166 may be deployed after the movement between the partially expanded position 49 and the expanded position 50, but may desirably be moved into the stowed position 171 during movement of center module 20 and then moved to the deployed position 172 when the center module 20 is extended and the carrier 10 reaches the expanded position 50. To place the carrier 10 in the retracted position 48, the procedure described above is reversed.

When the carrier 10 is positioned in the partially extended position 49, only the end module 22 moves into the partially extended position 49, and the center module 20 only moves away from the portion of the housing 24 when in the fully extended position 50. However, it will be appreciated that the carrier 10 may be reasonably altered such that only the center module 20 may be positioned in the partially extended position 49, while the end module 22 may be simultaneously retained in the retracted position 48 within the center module 20 (not shown).

The housing 12, the center and end modules 20, 22, respectively, and the first and second doors, 40, 44, respectively, are preferably, but not by way of limitation, constructed from acrylonitrile butadiene styrene ("ABS") and/or high density polyethylene ("HPDE"), and/or other plastic material(s). The housing 12, the center and end modules 20, 22, respectively, and the first and second doors, 40, 44, respectively, may also be constructed, partially or completely, from a metal, such as, for example, but not by way of limitation, aluminum. Hardware for the carrier, such as, for example, but not by way of limitation, latches, locks, brackets, rivets, and the like, may desirably be formed at least partially from metal, such as aluminum, steel, and the like, and are commercially available.

The telescoping assembly 102 is preferably constructed from plastic and/or metal(s), and the like. The respective first pair of rail assemblies 58, 59, and the respective second pair of rail assemblies 60, 61, are constructed from metal and/or plastic, and the like. Hardware such as, for example, but not by way of limitation, brackets 144, 146, and rivets 93, 95, 97 may be constructed from metal and/or plastic. It will be appreciated that any material or combination of materials may be used for any part of component described herein, so long as the material or combination of materials perform as shown and described in detail herein.

The foregoing is considered as illustrative only of the principles of the disclosure. Further, since numerous modifications and changes will readily occur to those of ordinary skill in the art, it is not desired to limit the disclosure to the exact construction and operation shown and described, and accordingly, all suitable modifications and equivalents may be resorted to, falling within the scope of the disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A carrier for the roof of a vehicle, the carrier comprising:
  a housing including an outer surface and an inner surface, the inner surface forming a compartment within the housing, the housing including a first opening having a first door connected thereto, and a second opening;
  a center module including an outer surface and an opening therethrough forming an inner surface, the inner surface forming a compartment within the center module, the outer surface of the center module configured to fit within the compartment in a portion of the housing;
  an end module including an outer surface and an opening therethrough forming an inner surface, the inner surface forming a compartment within the end module, the end module having an outer surface configured to fit within the compartment of the center module, the end module carrying a frame positioned at an end perimeter thereof, the frame including a second door positioned to cover the second opening in the carrier;

a telescoping assembly connected to an outer surface of the housing and to the frame, the telescoping assembly configured to: a) hold the center module and the end module in the portion of the housing, b) move the end module into a preselected position away from the center module, and c) move the center module into a preselected position away from the portion of the housing while the end module is positioned away from the center module; and a first pair of telescoping rails and a second pair of telescoping rails, the first pair of telescoping rails connected to each side of the portion of the housing and to each side of the center module, respectively, and the second pair of telescoping rails connected to the each side of the center module and to each side of the end module respectively, wherein when the telescoping assembly is actuated to move the end module away from the center module, the second pair of telescoping rails simultaneously move and support the end module, and wherein when the telescoping assembly is actuated to move the center module away from the portion of the housing, the first pair of telescoping rails simultaneously move and support the center module.

2. The carrier for the roof of a vehicle of claim 1, wherein the telescoping assembly is actuated to move both the end module and the center module away from the housing in a fully extended position, wherein the telescoping assembly is actuated to move the end module away from the center module which is retained within the portion of the housing to form a partially extended position, and wherein the telescoping assembly is actuated to move both the center and end modules in a retracted position within the portion of the housing.

3. The carrier for the roof of a vehicle of claim 2, wherein one portion of the telescoping assembly is carried by the housing and an opposite other portion of the telescoping assembly is carried by the frame.

4. The carrier for the roof of a vehicle of claim 3, wherein the telescoping assembly includes a push button which actuates movement of at least one of the center module and the end module, wherein the movement actuated by the push button moves the at least one of the center module and the end module into a preselected position, and wherein the preselection position is selected from the group consisting of the retracted position, the partially extended position, and the fully extended position.

5. The carrier for the roof of a vehicle of claim 1, wherein each rail of the upper pair of telescoping rails includes a first section, a second section, and a third section, and wherein the first sections are connected to a pair of sides, respectively, of the portion of the housing, and the third sections are connected to a pair of sides, respectively, of the center module, and each second section moves away from each first section, and each third section moves away from each second section when in the fully expanded position, and at least a portion of the first, second, and third sections overlap when in a retracted position.

6. The carrier for the roof of a vehicle of claim 5, wherein each rail of the lower pair of telescoping rails include a first section, a second section, and a third section, and wherein the first sections are connected to the pair of sides, respectively, of the center module, and the third sections are connected to the pair of sides, respectively, of the end module, and each second section moves away from the each first section and each third section moves away from each second section when in the fully expanded position, and at least a portion of the first, second, and third sections overlap when in the retracted position.

7. The carrier for the roof of a vehicle of claim 1, wherein the carrier includes at least one pair of legs on at least one of the end module and the center module.

8. The carrier for the roof of a vehicle of claim 7, wherein the at least one pair of legs include a pair of telescopic legs that are each telescopically adjustable and which are foldably carried on a lower surface of the center module.

9. The carrier for the roof of a vehicle of claim 7, wherein the at least one pair of legs include a pair of legs having a plurality of openings therein that are connected to a portion of the frame, wherein each leg is extendably adjustable.

10. A method of using a carrier for the roof of a vehicle, the method comprising:

providing a housing including an outer surface and an inner surface, the inner surface forming a compartment within the housing, the housing including a first opening having a first door connected thereto, and a second opening;

providing a center module to the housing, the center module including an outer surface and an opening therethrough forming an inner surface, the inner surface providing a compartment within the center module, the center module having a first end positioned to move into the second opening of the housing, and the outer surface of the center module configured to fit within the inner surface of a portion of the housing through the second opening therein;

connecting the center module to the housing by connecting a first pair of telescoping rails to opposing sides of the housing and to opposing sides of the center module, respectively;

providing an end module including an outer surface and an opening therethrough forming an inner surface, the inner surface providing a compartment within the end module, the end module having a first end positioned to move into a second opening of the center module, the outer surface of the end module configured to fit within the inner surface of the center module through the second opening therein, the end module carrying a frame positioned at a second end thereof, the frame including a second door to cover the second opening;

connecting the end module to the center module by connecting a second pair of telescoping rails to opposing sides of the center module and to opposing sides of the end module, respectively;

actuating a telescoping assembly connected to at least the housing and the frame, and moving the end module away from the center module from the retracted position to the partially extended position, and actuating the telescoping assembly and moving the center module away from the portion of the housing from the partially extended position to the fully extended position;

simultaneously moving and supporting the end module via at least the second pair of telescoping rails when the telescoping assembly is actuated, thereby simultaneously moving the end module away from the center module in the partially extended position; and simultaneously moving and supporting the center module by at least the first pair of telescoping rails when the telescoping assembly is actuated, thereby simultaneously moving the center module away from the housing in the fully extended position.

11. The method of claim 10, further comprising the step of actuating the telescoping assembly to move the end module and the center module into a retracted position within the portion of the housing, and comprising the step of simultaneously actuating the second pair of telescoping rails and the first pair of telescoping rails to move and support the end module and the center module, respectively, into the portion of the housing in the retracted position.

12. The method of claim 11, wherein one portion of the telescoping assembly is carried by the housing and an opposite other portion of the telescoping assembly is carried by the frame, wherein the telescoping assembly includes a push button which actuates movement of at least one of the center module and the end module, wherein the movement actuated by the push button moves the at least one of the center module and the end module into a preselected position, and wherein the preselection position is selected from the group consisting of the retracted position, the partially extended position, and the fully extended position.

13. The method of claim 10, wherein in the step of connecting the center module to the housing by connecting a first pair of telescoping rails to opposing sides of the housing and to opposing sides of the center module, each rail of the first pair of telescoping rails includes a first section, a second section, and a third section, and wherein the first sections are connected the opposing sides, respectively, of the portion of the housing, and the third sections are connected to the opposing sides, respectively, of the center module, and each second section moves away from each first section, and each third section moves away from each second section when in the fully expanded position, and at least a portion of the first, second, and third sections overlap when in the retracted position.

14. The method of claim 13, wherein each rail of the second pair of telescoping rails includes a first section, a second section, and a third section, and wherein the first sections are connected the opposing sides, respectively, of the center module, and the third sections are connected to the opposing sides, respectively, of the end module, and each second section moves away from the each first section, and each third section moves away from each second section, when in the fully expanded position, and at least a portion of the first, second, and third sections overlap when in the retracted position.

15. The method of claim 10, further including a step of providing at least one pair of legs to the carrier, wherein only the at least one pair of legs touch the roof of the vehicle.

16. The method of claim 15, wherein the pair of legs are telescoping legs and are foldably carried on a lower surface of the center module.

17. The method of claim 15, wherein the at least one pair of legs include a pair of legs having a plurality of openings therein that are connected to a portion of the frame, wherein each leg is extendably adjustable.

18. A carrier assembly for the roof of a vehicle, the carrier assembly comprising:
a housing including an inner surface, the inner surface forming a compartment therein, the housing including a first opening having a first door connected thereto, and a second opening;
a center module including an outer surface and an opening therethrough forming an inner surface configured to form a compartment, the outer surface of the center module configured to fit within the compartment of a portion of the housing;
an end module including an outer surface and an opening therethrough forming an inner surface configured to form a compartment, the end module configured to fit within the compartment of the center module, the end module carrying a frame positioned at an end perimeter thereof, the frame including a second door positioned to cover the second opening in the carrier; and
a telescoping assembly connected to an outer surface of the housing and to the frame, the telescoping assembly configured to: a) hold the center module and the end module in the portion of the housing, b) move the end module into a preselected position away from the center module, and c) move the center module into a preselected position away from the portion of the housing while the end module is positioned away from the center module.

19. The carrier assembly of claim 18, wherein one portion of the telescoping assembly is carried by the housing and an opposite other portion of the telescoping assembly is carried by the frame, and wherein the telescoping assembly includes a push button which actuates movement of at least one of the center module and the end module between preselected positions of the at least one of the center module and the end module, and wherein the movement actuated by the push button moves the at least one of the center module and the end module into the preselected position and holds the at least one of the center module and the end module, and wherein the preselection position is selected from the group consisting of the retracted position, the partially extended position, and the fully extended position.

20. The carrier assembly of claim 18, further comprising a first pair of telescoping portions and a second pair of telescoping portions, the first pair of telescoping portions connected to the portion of the housing and to the center module, respectively, and the second pair of telescoping portions connected to the center module and to the end module respectively, wherein when the telescoping assembly is actuated to move the end module away from the center module, the second pair of telescoping portions simultaneously move and support the end module, and wherein when the telescoping assembly is actuated to move the center module away from the portion of the housing, the first pair of telescoping portions simultaneously move and support the center module.

* * * * *

UNITED STATES PATENT AND TRADEMARK OFFICE
CERTIFICATE OF CORRECTION

| | |
|---|---|
| PATENT NO. | : 11,667,245 B2 |
| APPLICATION NO. | : 17/531964 |
| DATED | : June 6, 2023 |
| INVENTOR(S) | : Tony Neesham |

It is certified that error appears in the above-identified patent and that said Letters Patent is hereby corrected as shown below:

On the Title Page

Item (54) and in the Specification, Column 1, Lines 1-2, Please delete the Title of the Invention:
"EXPENDABLE ROOF TOP CARGO CARRIER FOR A VEHICLE"
And substitute therefor:
-- EXTENDABLE ROOF TOP CARGO CARRIER FOR A VEHICLE --.

Signed and Sealed this
Eighteenth Day of June, 2024

Katherine Kelly Vidal
*Director of the United States Patent and Trademark Office*